Patented Aug. 2, 1932

1,869,624

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

RUBBER VULCANIZATION PROCESS

No Drawing.   Application filed January 24, 1929.   Serial No. 334,359.

The present invention relates to processes for manufacturing vulcanized rubber products and to the products obtained thereby. It is more particularly directed to processes for vulcanizing rubber wherein there is incorporated into a rubber mix of vulcanization characteristics a compound of the type hereinafter disclosed whereby anti-oxidant or age resisting properties are developed in the vulcanized rubber product. The invention will be understood from the following description and examples of a preferred mode of operating the process wherein the invention is fully set forth and described.

It is well known among rubber chemists that rubber compounds cured in the presence of vulcanization accelerators such as the aldehyde derivatives of Schiff's bases, deteriorate much less rapidly in storage or in service than do similar rubber products cured in the presence of certain accelerators such, for example, as diphenyl-guanidine. Certain other compounds that otherwise would function favorably as rubber vulcanization accelerators cannot be employed commercially since the presence of such compounds apparently causes or aids in causing a rapid deterioration of the vulcanized rubber products. Such rubber products are said to age badly, that is, in storage or in service the rubber becomes hard and loses a large part of its resiliency, while other characteristics such as tensile strength and the like are very detrimentally affected.

The age resisting characteristics of a vulcanized rubber product can be readily ascertained by subjecting samples of the vulcanized product in a bomb to the action of oxygen under pressure and at an elevated temperature. The aged rubber samples are then examined and tested and the test data compared with the results obtained on testing the unaged rubber samples. The deterioration in properties effected as a result of the oxidation treatment is indicative of the result that would normally be expected of that particular rubber stock during actual service. Such a test is known as the Bierer-Davis aging test and produces an effect on a vulcanized rubber stock comparable with that resulting from several years of natural aging of the rubber, depending upon the conditions of the test.

According to the present invention, a new class of anti-oxidants has been found which, upon incorporating into a rubber stock, imparts exceptional age resisting qualities to the vulcanized rubber stock. The compounds herein disclosed as imparting such anti-oxidant characteristics to vulcanized rubber comprise the reaction product of ketones and naphthylamines.

One of the preferred class of anti-oxidants comprising the reaction product of alpha-naphthylamine and acetone was prepared in the following manner.

Substantially equi-molar portions of alpha-naphthylamine (143 parts) and acetone (58 parts) were placed in a vessel equipped with a reflux condenser. Approximately 2 parts of a suitable catalyst, for example iodine, were added and the mixture refluxed for a period of time required to produce the desired reaction, for example, approximately three hours. Substantially ten additional parts of acetone were added and the reaction mixture was refluxed for an additional hour. The reaction product was then isolated by distillation under a pressure less than atmospheric pressure. The product thus obtained was a light yellow thick oil. The reaction described may be represented as follows:

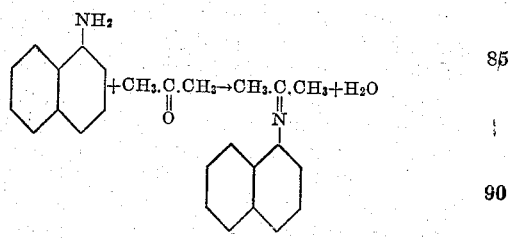

A sample of this material was compounded in the usual manner in a rubber mix of the following composition: 100 parts of pale crepe rubber, 5 parts of zinc oxide, 3.5 parts of sulfur, .75 parts of diphenyl-guanidine, 2.0 parts of the reaction product of substantially equi-molar portions of acetone and alpha-naphthylamine.

The stock was then vulcanized by heating sheets of the stock in the usual manner for 45 minutes at the temperature given by 40 pounds of steam pressure per square inch (that is 287° F.). Portions of the stock cured as set forth were then artificially aged by heating the same in an oxygen bomb for 18 hours at a temperature of 75° C. and under a pressure of 300 pounds of oxygen per square inch. The results obtained upon testing the aged and the unaged stocks are as follows:

| Time of cure | Hours aged | Modulus of elasticity in lbs./in.² at elongations of | | | Tensile at break in lbs./in.² | Ultimate elongation |
|---|---|---|---|---|---|---|
| | | 300% | 500% | 700% | | |
| 45 min. @ 287° F. | 0 | 171 | 525 | 2075 | 2835 | 763 |
| 45 min. @ 287° F. | 18 | 223 | 666 | 2095 | 2285 | 710 |

In all of the examples cited, diphenyl-guanidine was used as an accelerator because it is known to produce a vulcanized rubber stock that has very poor aging qualities. Other accelerators could, of course, be employed and would produce a stock possessing different tensile strength from those set forth.

Ketones react with alpha-naphthylamine in other than equi-molar portions to form the preferred class of compounds. Thus, for example, substantially one molar portion of alpha-naphthylamine (143 parts) and somewhat more than three molar portions of acetone (180 parts) and 0.5 parts of a suitable condensing agent, for example iodine, were placed in a vessel equipped with a reflux condenser, and refluxed for approximately 22 hours. The aqueous layer present was separated by any convenient method, for example by means of a separatory funnel. The remainder of the water formed by the condensation of acetone and alpha-naphthylamine and the unreacted acetone were eliminated by distillation at atmospheric pressure. A weight of the water formed by the reaction showed that a condensation between more than one molar portion of the ketone and substantially one molar portion of alpha-naphthylamine had taken place. The residue remaining after the elimination of water and unreacted acetone comprises one of the preferred class of anti-oxidants. This material was compounded in the usual manner in a rubber mix comprising 100 parts of pale crepe rubber, 5 parts of zinc oxide, 3.5 parts of sulfur, .8 part of diphenyl-guanidine, 2.0 parts of anti-oxidant.

The stock was then vulcanized in a press in the usual manner for thirty minutes at the temperature given by forty pounds of steam pressure per square inch (that is 287° F.). Portions of the stock cured as set forth were then artificially aged in the manner previously described by heating for twenty-four hours at a temperature of 85° C. and under an oxygen pressure of 400 pounds per square inch. A comparison of the results obtained by testing the aged and unaged stocks follows:

| Time of cure | Hours aged | Modulus of elasticity in lbs./in.² at elongations of | | | Tensile at break in lbs./in.² | Ultimate elongation |
|---|---|---|---|---|---|---|
| | | 300% | 500% | 700% | | |
| 30 min. at 287° F. | 0 | 197 | 387 | 1325 | 2425 | 830 |
| 30 min. at 287° F. | 18 | 153 | 391 | 1365 | 1780 | 790 |

It is seen from the data hereinbefore given that even under the drastic treatment of the test which is equal to approximately three years of natural aging, the samples that had been subjected to the aging tests retained to a remarkable degree their unaged characteristics.

As a further example illustrative of the anti-oxidant effect of the preferred class of compounds, a tread stock was compounded comprising 54 parts of smoked sheet rubber, 12.25 parts of zinc oxide, 25 parts of carbon black, 4.5 parts of mineral rubber, 0.5 parts of stearic acid, 1.875 parts of sulfur, 0.625 parts of diphenyl-guanidine, 0.75 parts of the reaction product of substantially one molar portion of alpha-naphthylamine and somewhat more than three molar portions of acetone.

Portions of this stock on vulcanizing by heating in a press for forty-five minutes at the temperature given by forty pounds of steam pressure per square inch (that is 287° F.) showed a tensile at break of 3360 pounds per square inch and an ultimate elongation of 610%. Test strips of this same vulcanized rubber when aged according to the method previously described by heating for forty-eight hours at a temperature of 70° C. and under a pressure of 300 pounds of oxygen per square inch gave a tensile at break of 1980 pounds per square inch and an ultimate elongation of 500%.

Another of the preferred class of compounds, for example, the reaction product of acetophenone (phenylmethyl ketone) and alpha naphthylamine, was prepared in the following manner:

Substantially equi-molar portions of acetophenone (120 parts) and alpha naphthylamine (143 parts) were placed in a suitable vessel, 1.25 parts of a suitable condensing agent, for example iodine, were added and the mixture heated for substantially four hours at approximately 165 to 175° C. After standing for a period of time, as for example over night, the reaction product was heated for an additional period of substantially two hours at a temperature of 200 to 230° C. The product thus obtained was a dark colored syrup. The reaction described proceeds most probably in the manner represented by the following equation:

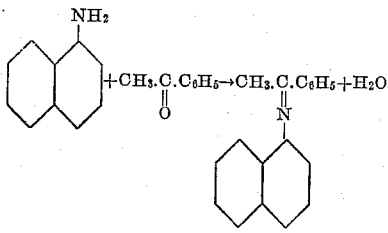

Samples of the reaction product of acetophenone and alpha-naphthylamine obtained as hereinbefore described were incorporated in a rubber mix in the usual manner comprising 100 parts of pale crepe rubber, 5 parts of zinc oxide, 3.5 parts of sulfur, 0.75 parts of diphenyl-guanidine, 2.0 parts of the reaction product of acetophenone and alpha-naphthylamine.

The stock was then vulcanized by heating sheets of the stock in the usual manner for forty-five minutes at the temperature given by forty pounds of steam pressure per square inch (that is 287° F.). Portions of the stock cured as set forth were then artificially aged by heating in an oxygen bomb for eighteen hours at 75° C. and under a pressure of 300 pounds of oxygen per square inch. The results obtained by testing the aged and unaged stocks follow:

| Time of cure | Hours aged | Modulus of elasticity in lbs./in.² at elongations of | | | Tensile at break in lbs./in.² | Ultimate elongation |
|---|---|---|---|---|---|---|
| | | 300% | 500% | 700% | | |
| 45 min at 287° F. | 0 | 171 | 538 | 2060 | 3005 | 760 |
| 45 min. at 287° F. | 18 | 191 | 565 | 1950 | 2460 | 740 |

As seen from the data set forth in the present specification, the preferred class of compounds, that is, the reaction product of a ketone and a naphthylamine, constitute an important group of anti-oxidants which function particularly well in both pure gum and tread stocks.

The various examples hereinbefore set forth in detail are to be understood as illustrative only and not at all limitative of the scope of the invention. Other compounding ingredients and other proportions of ingredients than those indicated in the various examples may be employed in the manufacture of various types of vulcanized rubber products as is well known to those skilled in the art to which the invention pertains. The invention is to be understood as limited solely by the claims attached hereto as a part of this specification, wherein the invention is claimed as broadly as possible in view of the prior art.

What is claimed is:

1. The process of manufacturing a vulcanized rubber product possessing age resisting characteristics which comprises incorporating with said product, prior to vulcanization, a reaction product of a ketone containing a methyl group attached to the carbon atom of the ketone group and a naphthylamine.

2. The process of manufacturing a vulcanized rubber product possessing age resisting characteristics which comprises incorporating with said product prior to vulcanization, a reaction product of acetone and alpha naphthylamine.

3. The process of manufacturing a vulcanized rubber product possessing age resisting characteristics which comprises incorporating with said product, prior to vulcanization, a reaction product of substantially equi-molar portions of acetone and alpha naphthylamine.

4. An age resisting rubber product comprising the vulcanization product of a rubber stock containing, prior to the vulcanization of said stock, a reaction product of a ketone containing a methyl group attached to the carbon atom of the ketone group and naphthylamine.

5. An age resisting rubber product comprising the vulcanization product of a rubber stock containing, prior to the vulcanization of said stock, a reaction product of acetone and alpha naphthylamine.

6. An age resisting rubber product comprising the vulcanization product of a rubber stock containing, prior to the vulcanization of said stock, the reaction product of substantially equi-molar portions of acetone and alpha naphthylamine.

7. The process of manufacturing a vulcanization rubber product possessing age resisting characteristics which comprises incorporating with said product prior to vulcanization a reaction product of a ketone containing a methyl group attached to the carbon atom of the ketone group and alpha naphthylamine.

8. An age resisting rubber product comprising the vulcanization product of a rubber stock containing, prior to the vulcanization of said stock, the reaction product of a ketone containing a methyl group attached to the carbon atom of the ketone group and alpha naphthylamine.

9. The process of manufacturing a vulcanized rubber product possessing age resisting characteristics which comprises incorporating with said product, prior to vulcanization, a reaction product of a naphthylamine and a member of a group of compounds consisting of acetone and acetophenone.

10. An age resisting rubber product comprising the vulcanization product of a rubber stock containing, prior to the vulcanization of said stock, a reaction product of a naphthylamine and a member of a group of compounds consisting of acetone and acetophenone.

In testimony whereof I hereunto affix my signature.

WINFIELD SCOTT.